US009309151B2

(12) United States Patent  
Scheurman, III

(10) Patent No.: US 9,309,151 B2  
(45) Date of Patent: Apr. 12, 2016

(54) PROCESS FOR LIME SLURRY PRODUCTION

(71) Applicant: Applied Specialties, Inc., Avon Lake, OH (US)

(72) Inventor: Clarence Scheurman, III, Westlake, OH (US)

(73) Assignee: Applied Specialties, Inc., Avon Lake, OH (US)

( * ) Notice: Subject to any disclaimer, the term of this patent is extended or adjusted under 35 U.S.C. 154(b) by 0 days.

(21) Appl. No.: 14/812,205

(22) Filed: Jul. 29, 2015

(65) Prior Publication Data

US 2015/0329421 A1   Nov. 19, 2015

Related U.S. Application Data

(62) Division of application No. 13/355,872, filed on Jan. 23, 2012.

(51) Int. Cl.
   *C04B 2/06* (2006.01)
   *C04B 2/08* (2006.01)
   *C02F 5/06* (2006.01)

(52) U.S. Cl.
   CPC ... *C04B 2/06* (2013.01); *C02F 5/06* (2013.01); *C04B 2/08* (2013.01)

(58) Field of Classification Search
   None
   See application file for complete search history.

(56) References Cited

U.S. PATENT DOCUMENTS

| 4,464,353 | A | 8/1984 | Hains |
| 5,616,283 | A | 4/1997 | Huege et al. |
| 6,059,974 | A | 5/2000 | Scheurman, III |
| 7,718,085 | B1 * | 5/2010 | Scheurman, III ............. 252/181 |
| 7,897,062 | B1 * | 3/2011 | Scheurman, III ............. 252/181 |
| 2013/0187087 | A1 * | 7/2013 | Scheurman, III ............. 252/192 |

FOREIGN PATENT DOCUMENTS

WO   02/092701 A1   11/2002

OTHER PUBLICATIONS

PCT International Preliminary Report on Patentability of the PCT from International Application No. PCT/US2012/054803 dated Jul. 29, 2014.
PCT Written Opinion of the International Searching Authority from International Application No. PCT/US2012/054803 mailed on Nov. 20, 2012.
PCT International Search Report from International Application No. PCT/US2012/054803 mailed on Nov. 20, 2012.
Patent Examination Report No. 1 from Australia Patent Application No. 2012367236 dated Sep. 23, 2015, 3 pages.

* cited by examiner

*Primary Examiner* — Joseph D Anthony
(74) *Attorney, Agent, or Firm* — Brouse McDowell; Jennifer L. Hanzlicek

(57) ABSTRACT

One or more techniques and/or systems are disclosed for a process of reducing the usage of lime in a lime slurry, comprising the steps of: 1) forming a mixture comprising at least one polymeric dispersant comprising a straight chain polyacrylate homopolymer and a quantity of water; 2) introducing the mixture to a vessel prior to slaking for preparation of the lime slurry; and 3) slaking a quantity of lime and the mixture in the vessel to form the lime slurry, wherein the usage of lime in the lime slurry is reduced by about 25% to about 37%.

6 Claims, 1 Drawing Sheet

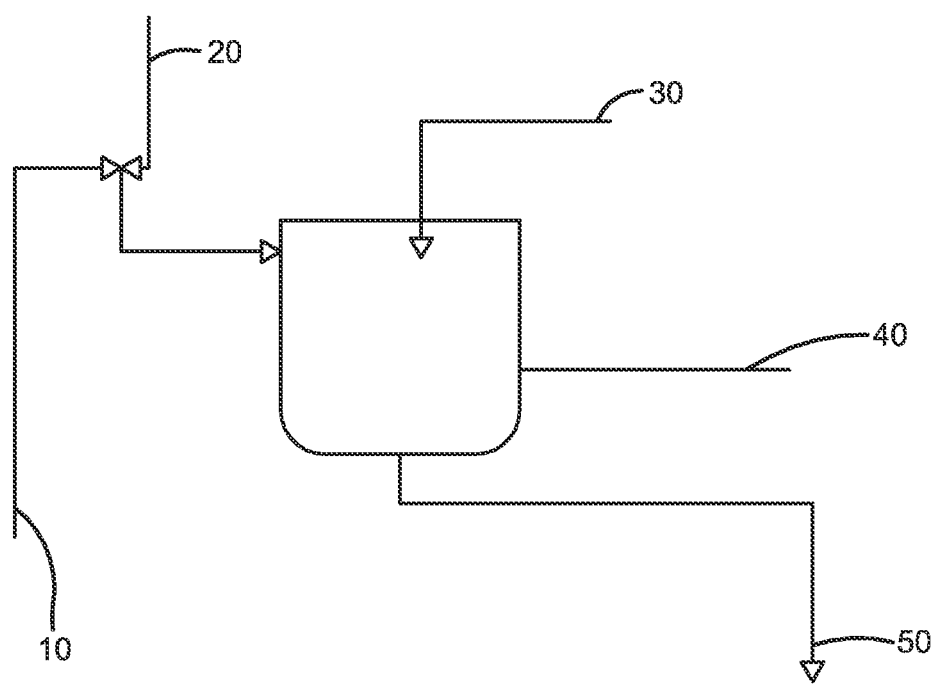

PROCESS FOR LIME SLURRY PRODUCTION

This application is a divisional application of U.S. Ser. No. 13/355,872, filed Jan. 23, 2012 now abandoned, which is incorporated herein by reference.

BACKGROUND

Suspensions of alkaline-neutralizing agents may be used in a variety of diverse applications. Alkaline-neutralizing agents may be, for example, caustic solutions or lime slurries. Lime slurries can commonly be used in a water-softening process called "lime softening" where lime causes 'hardness' ions to precipitate from and settle out of solution, thus softening the water. In wastewater and process water applications, it can be desirable to use lime slurries instead of conventional caustic (often prepared from sodium hydroxide, or "NaOH") solutions to adjust the pH of, or to neutralize acidic solutions on a commercial, municipal, and/or industrial scale.

In order to make these suspensions of alkaline-neutralizing agents, an alkaline chemical may be required. An alkaline chemical (those chemicals having a pH greater than 7) may be a chemical like NaOH or lime. To neutralize acidic solutions of both raw and treated water, caustic solutions can be used. These high-concentration caustic solutions (for example, about 50% NaOH with the balance as water) can be typically used for many of these applications due to the difficulty in handling lime and its traditional slurries, described in summary below. However, caustic solutions can be highly dangerous and must be carefully controlled to ensure that humans do not come into contact with these solutions, which can cause severe burns. In addition, the solid NaOH particles that often can be used to make caustic solutions by dissolution in water also present serious health concerns, and their use, shipment, and storage must be carefully controlled; they are subject to numerous safety regulations. Lime can be considerably less expensive than NaOH and also may be preferable from a health-safety standpoint, but handling problems associated with lime typically overshadow its use. These alkaline-neutralizing agents may contain lime particles, which can be suspended in lime slurries. One example of lime slurry usage can be in sewage and wastewater treatment, where alkaline-neutralizing agents may commonly be used to treat large amounts of water that have an acidic pH, or to increase the pH of the water to kill bacteria, microbes, and/or other organisms.

Lime slurries may sometimes be used as a substitute for caustic solutions to raise or neutralize the pH of commercial-scale acidic solutions such as treated wastewater. Unlike NaOH solution, these slurries may not be true solutions but instead can be suspensions of solid particles of hydrated lime in water. To make a lime slurry, particles of quicklime (chemically, calcium oxide or CaO) can be added to a water carrier, wherein the quicklime particles are hydrolyzed to produce particles of hydrated lime ($Ca(OH)_2$). Alternatively, dry hydrated lime, $Ca(OH)_2$ can be slurried with water to make a hydrate slurry.

Lime slurries may exhibit comparable reducing or alkaline-pH neutralizing power as alkali-metal hydroxide solution caustic agents while not requiring the addition of potentially hazardous alkali-metal hydroxides to the slurries. A conventional lime-based caustic-replacement slurry may include a quantity alkali-metal hydroxide in the slurry.

To approach the neutralization power of conventional caustic solutions, very-high solids lime slurries may be used, for example about or exceeding 30% hydrated lime solids by weight. But using such high-content lime solids can be problematic because the resulting viscosity can render the slurries impractical or un-useful from a materials-handling standpoint. One way to reduce the viscosity of a high solids lime slurry may be to add gypsum.

Another method to moderate the viscosity of a high-solids content hydrated lime suspension may be to incorporate a polymeric dispersing agent. For example, certain polyacrylic acids have been used as dispersing agents to moderate the viscosity of such a high-solids suspension. Other methods of making an alkaline-neutralization agent with high solids have been outlined in several patent applications. Some examples of these high solids lime slurries have been outlined in U.S. Pat. No. 7,718,085 and U.S. Pat. No. 7,897,062. However, creating lime slurries, especially a high solid version, can lead to scale. One issue with using lime slurries can be scaling with the equipment. For example, the increase in solids can result in very high viscosities and can also lead to increased scaling in the slurry-producing and conveying equipment as well as in other areas within the process. This scaling can occur within the atomizers of a spray dry absorber (SDA). The scaling can lead to maintenance issues, feed rate decrease, density changes, and reduction of stability in the sulfur oxide ($SO_x$) levels in the SDA. Other inconsistencies not listed herein may also occur within the lime slurry process. In addition, scaling may also increase lime usage.

Therefore, it is desirable to develop the process in which scaling may be reduced in the production of a lime slurry in order to reduce these issues associated with scaling described herein.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a process of reducing the usage of lime in a lime slurry, comprising the steps of: 1) forming a mixture comprising at least one polymeric dispersant comprising a straight chain polyacrylate homopolymer and a quantity of water; 2) introducing the mixture to a vessel prior to slaking for preparation of the lime slurry; and 3) slaking a quantity of lime and the mixture in the vessel to form the lime slurry, wherein the usage of lime in the lime slurry is reduced by about 25% to about 37%. The process may and generate a more highly reactive slurry that can reduce lime usage. In another implementation, the process may provide improved methods for reducing the scaling during the lime slurry process.

Accordingly, it is an object of the invention to provide a process of making an alkaline-neutralizing agent. It may include the step of forming a mixture comprising at least one polymeric dispersant and a quantity of water. It may also include the step of introducing the mixture to a vessel for preparation of a slurry. The alkaline-neutralization agent may comprise a lime slurry.

According to one embodiment, the process of forming the mixture comprising at least one polymeric dispersant and a quantity of water occurs prior to the step of introducing the mixture to the vessel for preparation of a slurry.

In another embodiment, the process of forming the mixture comprising at least one polymeric dispersant and a quantity of water occurs simultaneously with the step of introducing the mixture to the vessel for preparation of a slurry.

In yet another embodiment, the process of forming the mixture further comprises the step of adding the quantity of water to at least one polymeric dispersant.

In another embodiment, the process of forming the mixture further comprises the step of adding at least one polymeric dispersant to the quantity of water.

In another embodiment, at least one polymeric dispersant used within the process is a straight-chain polyacrylate homopolymer.

In another embodiment, at least one polymeric dispersant used within the process is heat-stable.

In still yet another embodiment, the process of making a slurry is performed under a batch process.

In still yet another embodiment, the process of making a slurry is performed under a continuous flow process.

In still yet another embodiment of the invention, the process of making an alkaline-neutralizing agent reduces scaling.

In still yet another embodiment, the process of making an alkaline-neutralizing agent reduces alkaline chemical usage.

In yet another embodiment, the process of making an alkaline-neutralizing agent reduces waste ash.

In still another embodiment, the process of making an alkaline-neutralizing agent reduces mercury gas emissions.

In another embodiment, the process of making a lime slurry comprises the steps of forming a mixture comprising at least one polymeric dispersant and a quantity of water wherein at least one polymeric dispersant is a straight-chain polyacrylate homopolymer and wherein at least one polymeric dispersant is heat-stable; forming a mixture comprising at least one polymeric dispersant and a quantity of water wherein at least one polymeric dispersant is added to quantity of water; and introducing the mixture to a vessel for preparation of a slurry wherein the process reduces scaling, reduces alkaline chemical usage, and reduces waste ash, and reduces mercury gas emissions.

In another embodiment, the process of making a lime slurry, comprises the steps of forming a mixture comprising at least one polymeric dispersant and a quantity of water wherein at least one polymeric dispersant is a straight-chain polyacrylate homopolymer and wherein at least one polymeric dispersant is heat-stable; and forming a mixture comprising at least one polymeric dispersant and a quantity of water wherein at least one polymeric dispersant is added to the quantity of water.

Further, what is disclosed herein can provide a process of making an alkaline-neutralizing agent that is easy to implement and use.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 1 is a flow diagram schematically illustrating the present invention.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A process for making an alkaline-neutralization agent is disclosed. The process can be used in all applications using an alkaline-neutralization agent to prepare a slurry, including a lime slurry 50. The alkaline-neutralization agent may comprise at least one polymeric dispersant 10 and a solvent. In one implementation, the solvent may be water 20. Besides the alkaline-neutralization agent, the slurry may also comprise an alkaline chemical like NaOH. The alkaline chemical may be NaOH in various forms including but not limited to pellets, flakes, chips, granules, and solutions. In one implementation, the slurry may contain slaked or hydrated lime, or a caustic replacement in softening applications and/or to neutralize acidic pH of wastewater and other aqueous liquids on a municipal, commercial, or industrial scale. It can also be used with high solids lime slurries, for example in those described in U.S. Pat. Nos. 7,718,085 and 7,897,062.

The method may use at least one polymeric dispersant 10 which does not suffer from the drawbacks of conventional polymeric dispersants: these heat-stable polymeric dispersants 10 can withstand elevated temperatures about or greater than 180° F. F (82° C.). Often, these heat-stable polymeric dispersants 10 may withstand temperatures at about 200° F. (93° C.) or about 225° F. (107° C.) without becoming inactivated or ineffective. These polymeric dispersants 10 can also be stable under the elevated pHs associated with a lime slurry 50.

If at least one heat-stable polymeric dispersant 10 is to be used, it may be selected so that it can be effective in maintaining the hydrated lime particles in the slurry and limiting hydrolysis of the quicklime particles suspended. The use of at least one heat-stable polymeric dispersant 10 may assist in sufficiently dispersing the hydrated lime particles in the water carrier phase so as to appropriately moderate the suspension viscosity as further described below for an extended period. At the same time, the use of at least one heat-stable polymeric dispersant 10 can withstand temperatures of about or in excess of 180° F. (82° C.), including those temperatures of about 200° F. (93° C.), about 215° F. (101° C.), about 220° F. (104° C.), or about 225° F. (107° C.) without losing the above-mentioned capability. In an embodiment of the present invention, the heat-stable polymeric dispersant 10 may be a straight-chain polyacrylate homopolymer having a molecular weight in the range of about 1000 g/mol to about 10000 g/mol, which can be made using an organic initiator and an isopropyl alcohol chain-transfer agent. In one implementation, the straight-chain structure of the heat-stable polymeric dispersant 10 like a polyacrylate homopolymer may contribute to a high degree of thermostability. With the production of a straight-chain homopolymer like polyacrylate homopolymer, the organic initiator may replace the persulfate/bisulfite redox reagents typically used as acrylate initiators, and the isopropyl-alcohol chain-transfer agent may regulate chain-length and molecular weight within the desired range without introducing ferrous sulfate typically used to make low molecular-weight polyacrylates, and may consequently exclude or can be substantially devoid of iron from the finished straight-chain homopolymer. In one implementation, the heat-stable polymeric dispersant 10 that may be used is available commercially from Coatex, LLC, Chester, S.C.

under product designation TH450-50AS, which is a straight-chain polyacrylate homopolymer having a nominal molecular weight of about 4500 g/mol and which comprises about 50% acid solids.

In addition, the heat-stable polymeric dispersant 10 may be able to withstand a high pH environment without being destroyed or modified. In one implementation, a high pH environment value may be about 9.5 to about 13.0. Both the heat stability and high pH resistance of the polymeric dispersant 10 can allow it to maintain its physical properties in order for it to be effective within the lime slurry 50 and in reducing and/or stopping lime scaling using systems such as those of an SDA. The polymeric dispersant 10 can maintain such properties as a small particle size, which in essence can increase the affected surface area of the polymeric particles and can provide a greater reaction potential for the polymeric dispersant-created lime slurry. This increased reaction potential may improve the performance of the lime slurry 50 within the SDA gas reaction zone and within clarifier mixing zones.

Within the process described herein, as shown in FIG. 1, the polymeric dispersant 10 addition may be made to the water 20 either prior to or simultaneously with the addition of this mixture to the vessel 40. The polymeric dispersant 10 may be added to the water 20, or the water 20 may be added to the polymeric dispersant 10. This vessel 40 may be a mixing vessel, a blending vessel, and/or a reaction vessel. The vessel 40 may also be any style or design. The vessel 40 may also be configured to provide a batch process or a continuous flow process. In one implementation, the water 20 may serve as the continuous phase for the suspension, and can be the medium in which the remaining, undissolved components (e.g. hydrated lime) may be suspended in the finished lime slurry 50.

In one implementation, the amount of the polymeric dispersant 10 used may be about 0.3% to about 1.5% by weight. In another implementation, the amount of water 20 used may be about 35% to about 60% by weight. The water 20 and the heat-stable polymeric dispersant 10 may then be mixed together, either prior to or simultaneously with, the addition to the vessel 40.

The balance of the lime slurry 50 may be comprised of hydrated lime either with or without gypsum. Although the gypsum may be added, it is not shown in FIG. 1. The lime slurry 50 may then be prepared according to the following methodology, wherein hydrated lime is produced in situ through hydrolysis of quicklime. The volume of total lime slurry 50 at the desired hydrated-lime solids content can first be determined based on application-specific parameters. Once these values are known, the appropriate amount of water 20 and polymeric dispersant 10 can then be charged to a mixing and/or blending vessel 40 equipped with agitators in which the lime slurry 50 can be prepared.

The process described herein may also be utilized in any lime slaking production unit design. Therefore, any vessels capable of withstanding temperatures achieved when slaking (hydrating) quicklime may also be considered useful to prepare the process and method disclosed. In one implementation, the temperatures may be up to or above 225° F. (101° C.).

Once the total amount of lime slurry 50 and the hydrated-lime concentration to be produced have been determined, an appropriate amounts of polymeric dispersant 10, water 20, and lime 30 can be added into the vessel 40 where the lime slurry 50 can be prepared. In one embodiment, the heat-stable polymeric dispersant 10 and the water 20 may be added at the same time, for example by co-injecting them or by impinging the polymeric dispersant 10 into the stream of the water 20 when filling the vessel 40, which may accelerate thorough and uniform mixing of the polymeric dispersant 10 into the water 20. After both the water 20 and the polymeric dispersant 10 have been added, a batch operation may be used to continue agitating the mixture for a period of time. In one implementation, this period of time may be 10 minutes to ensure uniform mixing. In continuous lime slurry operations, a static mixer may be used into which the polymeric dispersant 10 and water 20 may be added and mixed. Also, adding the polymeric dispersant 10 into a point within the piping for the water 20 may also be done.

If gypsum is to be added to the slurry, it can be added just prior to adding the quicklime into the mixture. As for the polymeric dispersant 10, the final desired hydrated-lime concentration in the lime slurry 50 can be determined in order to measure and deliver an appropriate amount of gypsum into the vessel 40 if gypsum were to be added. For operational purposes, the dosing may be done on the basis of the lime 30 feed to the slaker since this value can be measured and monitored.

Subsequently, the lime 30, for example quicklime, can be added into the water 20 within the vessel 40 under constant agitation. In one embodiment, the powdered quicklime may be injected below the water surface within the vessel 40 to avoid the generation of dust, which can result not only in certain health concerns for the operator but also the loss of an unknowable amount of quicklime from the hydrolysis reaction to produce suspended slaked lime (also referred to as hydrated lime or $Ca(OH)_2$). Furthermore, the rate of quicklime addition to the water can be regulated by the operator. For water volumes on the order of 15,000 gallons and quicklime quantities on the order of 50,000 pounds (which can produce a slurry of nominally about 39% to about 40% by weight of hydrated lime), the addition may last from about one to about two hours.

The lime 30 can begin to hydrolyze immediately on being introduced into the water 20. Consequently, during the time when the lime 30 may be added, the temperature of the vessel 40 and its contents may rise, potentially exceeding about 200° F. (93° C.) or about 225° F. (107° C.). Depending on the amount of lime slurry 50 required and the concentration of hydrated lime to be used, the hydration reaction typically may be completed within two to three hours after lime 30 addition, at which time the vessel 40 contents will begin to cool. As the example(s) below will demonstrate, a lime slurry 50 made according to this process may possess Brookfield viscosities in the range of about 650 cps to about 1000 cps as measured at 70° F. (21° C.) and 5 RPMs, with spindle #2, despite solids loadings in the range of about 30% to about 46% by weight.

The lime slurry 50, once made, can be stored for extended periods of time if necessary. If stored for a long enough time that settling does occur, the solids can simply be stirred back up through mixing or agitation prior to use. The lime slurry 50 does not suffer from significant particle agglomeration as already discussed, so it can be possible to re-suspend the solids prior to subsequent use.

A benefit of using the heat-stable polymeric dispersant 10 is that it can withstand the high temperatures in the lime slurry 50 resulting from the hydrolysis of quicklime to hydrated lime. Thus, the polymeric dispersant 10 can be added to the slurry mixture before the quicklime addition, and may remain functional to moderate viscosity for the finished high-solids lime slurry 50 (post-hydrolysis) to within an acceptable range from a materials-handling standpoint, for example from about 600 cps to about 2,000 cps at 70° F. (21° C.) 5 RPMs with spindle #2. In addition, a lime slurry 50 having the compositions and made as described above may not result in substantial agglomeration and sedimentation of hydrated lime particles, despite the incorporation of gypsum. The heat-stable polymeric dispersant 10 described above may inhibit the sort of particle agglomeration that typically has been known to result based on the addition of gypsum as a viscosity-control agent.

Additionally, the ability of the heat-stable polymeric dispersant 10 to withstand the temperatures seen during lime hydration (slaking) may be improved by adding the polymeric dispersant 10 to the water 20 before slaking the lime. Post-addition of the polymeric dispersant 10 to the vessel 40 after lime 30, namely quicklime, has been slaked to produce the hydrated lime in suspension has been found to lower slurry viscosity from baseline for a lime slurry 50 of about 40% solids by weight without any dispersant at all, with the resulting slurry viscosity still too high. This viscosity may be about 10,000 cps at 70° F. (21° C.) 5 RPMs with spindle #2, which may be too high to permit efficient handling and pumping with existing industrial equipment, which typically requires a viscosity below about 1,000 cps at 70° F. (21° C.) 5 RPMs with spindle #2 for efficient handling of fluids. Therefore, the order of adding the polymeric dispersant 10 may be important. When the polymeric dispersant 10 is added to the water 20 prior to the introduction of lime 30, namely quicklime, to produce hydrated lime in situ, the scaling can be reduced.

For the process described herein, there can be several different functional classes by which the spray dry absorbers (SDA) can follow. First, those applications using various purge waters for secondary atomization can be used. Second, applications which use higher quality water for secondary atomization can also be utilized. Last, an SDA application where some of the lime ash is recycled to improve the lime utilization can also be applied. These applications are not limited to those listed herein.

Along with those benefits listed above, several other benefits may also occur for this process, including but not limited to: 1) controlled scaling and depositing on the atomizers; and reduced overall systems maintenance; 2) reduced lime use; 3) reduced waste ash for disposal; 4) improved mercury removal in the stack gases; and 5) improved environmental emissions control.

First, in using the heat-stable polymeric dispersant 10 as described herein, the mixing and/or blending vessel 40 where the lime slurry 50 may be prepared can exhibit a substantial reduction in scale buildup. One of the most notable benefits of this process may be the controlled scaling and depositing of the atomizers and SDAs. In addition, the lime slurry 50 density decreases and the feed rate of the lime slurry 50 can also be decreased. Pipes and pumping systems for transporting the lime slurry 50 may be substantially deposit-free and may not suffer from plugging as with conventional hydrated-lime slurries. In addition, using a hydrated-lime slurry as disclosed herein, it may be possible to obtain comparable pH neutralization of wastewater as compared with conventional lime-based slurries with a smaller amount of slurry. This may suggest that a hydrated-lime slurry as disclosed herein can be more reactive from a pH-neutralization standpoint than conventional lime slurries, which may be due to the polymeric dispersant 10 disclosed herein being more effective to sustain small particles in suspension (preventing sedimentation and the deposition of sludge), as well as to permit a high-solids content of relatively small-sized hydrated lime particles (having greater available surface area) while maintaining an acceptable viscosity for material-handling purposes. This reduction in scale may lead to reduced overall systems maintenance and decreased operating costs associated with lime usage and maintenance issues.

Second, there may be additional benefits seen with this process described herein. The improved process can allow for a decreased lime 30 usage. This reduction in excess lime may result in a lime 30 use reduction from about 25% to about 37%. This reduction in excess lime 30 with its attending water 20 may lower the load during the process and can allow for a generation of a more stable feed rate since the lime slurry 50 created can appear to be more uniform. This improved stability of the system may also lead to more consistent products. For example, sulfur oxide ($SO_x$) levels can be more stable with the process.

Third, there can be a decrease of waste ash within the process described herein. In one implementation, this decrease of waste ash may range from about 25% to about 38%. This can result in a more favorable and environmentally positive process.

Next, the process as described herein may result in a decrease in mercury content for the ash products. Not only can this process control mercury gas emissions, but it may also result in another more favorable, environmentally positive process. This decrease in mercury may also improve the mercury removal in the stack gases.

Together, all of these benefits may provide improved productivity and costs associated with the process herein.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A process of reducing the usage of lime in a lime slurry, comprising the steps of:
   forming a mixture comprising at least one polymeric dispersant comprising a straight chain polyacrylate homopolymer and a quantity of water;
   introducing the mixture to a vessel prior to slaking for preparation of the lime slurry, and
   slaking a quantity of lime and the mixture in the vessel to form the lime slurry;
   wherein the usage of lime in the lime slurry is reduced by about 25% to about 37% by weight; and
   wherein the lime slurry is prepared under a continuous flow process.

2. The lime of claim 1, wherein the lime is CaO.

3. The lime of claim 1, wherein the lime is $Ca(OH)_2$.

4. The polymeric dispersant of claim 1, wherein the polymeric dispersant is about 0.3% to about 1.5% by weight of the lime slurry.

5. The process of claim 1, wherein said at least one polymeric dispersant is heat-stable to about 101° C.

6. A process of reducing the usage of lime in a lime slurry, comprising the steps of:
   forming a mixture comprising at least one polymeric dispersant and a quantity of water wherein at least one polymeric dispersant is a straight-chain polyacrylate homopolymer and wherein at least one polymeric dispersant is heat-stable;
   adding the mixture comprising at least one polymeric dispersant and the quantity of water to a quantity of lime;
   forming a lime slurry from the mixture comprising at least one polymeric dispersant, the quantity of water, and the quantity of lime,
   wherein the usage of lime in the lime slurry is reduced by about 25% to about 37% by weight; and
   wherein the lime slurry is prepared under a continuous flow process.

* * * * *